(12) United States Patent
Chen et al.

(10) Patent No.: US 12,545,076 B2
(45) Date of Patent: Feb. 10, 2026

(54) ROOF-MOUNTED UNIT FOR AIR CONDITIONER OF VEHICLE, AND AIR CONDITIONER COMPRISING SAME

(71) Applicant: Dometic Sweden AB, Solna (SE)

(72) Inventors: Jianmin Chen, Zhuhai (CN); Sihu Liu, Zhuhai (CN)

(73) Assignee: Dometic Sweden AB, Solna (SE)

( * ) Notice: Subject to any disclaimer, the term of this patent is extended or adjusted under 35 U.S.C. 154(b) by 339 days.

(21) Appl. No.: 18/156,913

(22) Filed: Jan. 19, 2023

(65) Prior Publication Data

US 2023/0226881 A1    Jul. 20, 2023

(30) Foreign Application Priority Data

Jan. 20, 2022 (CN) .......................... 202220152747.9

(51) Int. Cl.
  B60H 1/00 (2006.01)
  B60H 1/24 (2006.01)
(52) U.S. Cl.
  CPC ......... B60H 1/00528 (2013.01); B60H 1/245 (2013.01)
(58) Field of Classification Search
  CPC ................ B60H 1/245; B60H 1/00528; B60H 2001/00635; B60H 2001/00235
  See application file for complete search history.

(56) References Cited

U.S. PATENT DOCUMENTS

| | | | |
|---|---|---|---|
| 3,444,854 A | 5/1969 | Fraim | |
| 3,724,442 A | 4/1973 | Gurney | |

(Continued)

FOREIGN PATENT DOCUMENTS

| | | |
|---|---|---|
| AT | 168943 | 8/1998 |
| AT | 346760 | 12/2006 |

(Continued)

OTHER PUBLICATIONS

Office Action issued in DE Application No. 102023200320l mailed on Nov. 29, 2023.

(Continued)

*Primary Examiner* — Allen R. B. Schult
(74) *Attorney, Agent, or Firm* — Dinsmore & Shohl LLP

(57) ABSTRACT

A roof-mounted unit for an air conditioner of a vehicle wherein the roof-mounted unit includes a top cover and a chassis jointed to the top cover in a sealed manner, in which the top cover includes an upper housing and an upper foam shell attached to an inner side of the upper housing, and the chassis includes a base and a lower foam shell attached to an inner side of the base, wherein the upper foam shell, at a joint part thereof, sequentially comprises, from an outer side to an inner side, a first upper projection, a first upper recess and a second upper projection; the lower foam shell, at a joint part thereof, sequentially comprises, from an outer side to an inner side, a first lower recess and a first lower projection; and when the top cover is jointed to the chassis in a sealed manner, the first upper projection is jointed to the first lower recess in a matching manner, the first upper recess is jointed to the first lower projection in a matching manner, and the second upper projection is attached to an inner side of the first lower projection, thereby achieving a sealing joint between the upper foam shell and the lower foam shell.

8 Claims, 3 Drawing Sheets

(56) References Cited

U.S. PATENT DOCUMENTS

| | | |
|---|---|---|
| 3,727,537 A | 4/1973 | Harty |
| D284,025 S | 5/1986 | Armstrong |
| 4,641,502 A | 2/1987 | Aldrich et al. |
| 4,672,818 A | 6/1987 | Roth |
| 4,769,963 A * | 9/1988 | Meyerson ............... E04H 5/10 52/404.4 |
| D306,341 S | 2/1990 | Bales et al. |
| 5,062,351 A | 11/1991 | Kloster |
| 5,116,280 A | 5/1992 | Kloster |
| 5,531,641 A | 7/1996 | Aldrich |
| D376,640 S | 12/1996 | Kloster |
| 5,899,081 A | 5/1999 | Evans et al. |
| 6,116,095 A | 9/2000 | Radle |
| 6,213,197 B1 | 4/2001 | Ebbeson |
| 6,263,689 B1 | 7/2001 | Dodge et al. |
| 6,309,012 B1 * | 10/2001 | Fryk ............... B62D 33/0617 296/210 |
| 6,449,973 B2 | 9/2002 | Dodge et al. |
| 6,464,000 B1 | 10/2002 | Kloster |
| 6,719,207 B2 | 4/2004 | Kloster |
| 6,857,953 B2 | 2/2005 | Malott |
| 6,978,630 B2 | 12/2005 | Wensink et al. |
| 7,065,981 B2 | 6/2006 | Ebbeson |
| 7,140,192 B2 | 11/2006 | Allen et al. |
| 7,171,822 B2 | 2/2007 | Allen et al. |
| 7,234,315 B2 | 6/2007 | Allen et al. |
| 7,237,397 B2 | 7/2007 | Allen |
| 7,316,119 B2 | 1/2008 | Allen |
| 7,419,368 B2 | 9/2008 | Milks |
| 7,963,117 B2 | 6/2011 | Allen et al. |
| 8,056,351 B2 | 11/2011 | Marciano et al. |
| 8,056,933 B2 | 11/2011 | Liptak |
| 8,240,168 B2 | 8/2012 | Holguin |
| 8,440,143 B2 | 5/2013 | Liptak |
| 8,535,127 B2 | 9/2013 | Malott |
| 8,540,509 B1 | 9/2013 | Cantal |
| 8,568,209 B2 | 10/2013 | Boxum |
| 9,061,566 B2 * | 6/2015 | Hoehn ............... F16B 5/0012 |
| D762,289 S | 7/2016 | Schmidt et al. |
| D764,034 S | 8/2016 | Schmidt et al. |
| D764,035 S | 8/2016 | Schmidt et al. |
| 9,610,824 B2 | 4/2017 | Allen et al. |
| 9,631,832 B2 | 4/2017 | Malott |
| D785,771 S | 5/2017 | Bergin |
| D785,772 S | 5/2017 | Bergin |
| 9,834,062 B2 | 12/2017 | Esch |
| D811,566 S | 2/2018 | Liu et al. |
| D817,466 S | 5/2018 | Moseley |
| 9,975,405 B2 | 5/2018 | Siddiqui et al. |
| D824,499 S | 7/2018 | Williamson et al. |
| 10,093,152 B2 | 10/2018 | Allard et al. |
| 10,107,520 B2 | 10/2018 | Schmidt et al. |
| D832,987 S | 11/2018 | Bergin |
| D841,138 S | 2/2019 | Williamson et al. |
| D850,609 S | 6/2019 | Bergin |
| D862,668 S | 10/2019 | Moseley |
| D865,926 S | 11/2019 | Moseley |
| 10,508,867 B2 | 12/2019 | Dowell, Jr. et al. |
| 10,589,593 B2 | 3/2020 | Fedor et al. |
| D884,870 S | 5/2020 | Bergin |
| 10,696,129 B2 | 6/2020 | Bergin |
| D905,217 S | 12/2020 | Hederstierna et al. |
| D907,183 S | 1/2021 | Meda et al. |
| D915,569 S | 4/2021 | Meda et al. |
| D917,036 S | 4/2021 | Hederstierna et al. |
| 11,027,595 B2 | 6/2021 | Smith et al. |
| 11,034,208 B2 | 6/2021 | Williamson et al. |
| D940,289 S | 1/2022 | Hederstierna et al. |
| D944,374 S | 2/2022 | Hederstierna et al. |
| 11,247,537 B2 | 2/2022 | Chevalier |
| 11,254,183 B2 | 2/2022 | Peter et al. |
| D956,940 S | 7/2022 | Meda et al. |
| 11,376,925 B2 | 7/2022 | Williamson et al. |
| 11,472,256 B2 | 10/2022 | Williamson et al. |
| 11,511,603 B2 | 11/2022 | Bilston et al. |
| 11,560,036 B2 | 1/2023 | Williamson et al. |
| 11,571,945 B2 | 2/2023 | Liu et al. |
| 11,613,157 B2 | 3/2023 | Fedor et al. |
| D996,367 S | 8/2023 | Muthu et al. |
| D999,739 S | 9/2023 | Muthu et al. |
| 11,752,827 B2 | 9/2023 | Meda et al. |
| 2005/0160709 A1 | 7/2005 | Hollis |
| 2006/0052050 A1 | 3/2006 | Malott et al. |
| 2007/0221370 A1 | 9/2007 | Allen et al. |
| 2007/0227693 A1 | 10/2007 | Allen et al. |
| 2009/0209193 A1 | 8/2009 | Kloster et al. |
| 2019/0047353 A1 | 2/2019 | Williamson et al. |
| 2020/0039325 A1 | 2/2020 | Jensen |
| 2020/0338951 A1 | 10/2020 | Paci et al. |
| 2020/0338958 A1 | 10/2020 | Lundqvist |
| 2021/0061058 A1 | 3/2021 | Meda et al. |
| 2021/0061060 A1 | 3/2021 | Meda et al. |
| 2021/0207882 A1 | 7/2021 | Jurek |
| 2021/0276396 A1 | 9/2021 | Jurek |
| 2022/0001718 A1 | 1/2022 | Jurek |
| 2022/0009306 A1 | 1/2022 | Hornung |
| 2022/0063369 A1 | 3/2022 | Chen et al. |
| 2022/0169090 A1 | 6/2022 | Peter et al. |
| 2022/0176775 A1 | 6/2022 | Jurek et al. |
| 2022/0227200 A1 | 7/2022 | Hildebrand |
| 2022/0332170 A1 | 10/2022 | Williamson et al. |
| 2023/0048412 A1 | 2/2023 | Liptak et al. |
| 2023/0136360 A1 | 5/2023 | Strang et al. |
| 2023/0138744 A1 | 5/2023 | Strang et al. |
| 2023/0166576 A1 | 6/2023 | Liu et al. |
| 2023/0182528 A1 | 6/2023 | Strang et al. |
| 2023/0226879 A1 | 7/2023 | Fedor et al. |
| 2023/0226880 A1 | 7/2023 | Fedor et al. |
| 2023/0226881 A1 | 7/2023 | Chen et al. |
| 2023/0391162 A1 * | 12/2023 | Takezawa ............ B60H 1/00528 |

FOREIGN PATENT DOCUMENTS

| | | |
|---|---|---|
| AT | 352442 | 2/2007 |
| AT | 419984 | 1/2009 |
| AU | 7615898 | 1/1999 |
| AU | 2004202967 | 6/2005 |
| AU | 2005209633 | 3/2006 |
| AU | 2007202766 | 1/2008 |
| AU | 2007237183 | 6/2008 |
| AU | 2008288394 | 2/2009 |
| AU | 2009233601 | 6/2010 |
| AU | 2012261549 | 1/2013 |
| AU | 354553 S | 3/2014 |
| AU | 360022 S | 1/2015 |
| AU | 360131 S | 1/2015 |
| AU | 360132 S | 1/2015 |
| AU | 367405 S | 3/2016 |
| AU | 201612249 S | 5/2016 |
| AU | 201613590 S | 7/2016 |
| AU | 201613591 S | 7/2016 |
| AU | 201613592 S | 7/2016 |
| AU | 201613593 S | 7/2016 |
| AU | 2015226832 | 9/2016 |
| AU | 2016101949 | 12/2016 |
| AU | 2015289763 | 1/2017 |
| AU | 2017100215 | 3/2017 |
| AU | 201712794 S | 5/2017 |
| AU | 201712798 S | 5/2017 |
| AU | 2017200186 | 8/2017 |
| AU | 20180977 S | 3/2018 |
| AU | 201810968 S | 3/2018 |
| AU | 201810969 S | 3/2018 |
| AU | 201810970 S | 3/2018 |
| AU | 201810971 S | 3/2018 |
| AU | 201810972 S | 3/2018 |
| AU | 201810973 S | 3/2018 |
| AU | 201810975 S | 3/2018 |
| AU | 201810978 S | 3/2018 |
| AU | 2017222698 | 8/2018 |
| AU | 2017227050 | 8/2018 |
| AU | 2017222697 | 9/2018 |
| AU | 201816419 S | 1/2019 |
| AU | 2017364256 | 6/2019 |

(56) References Cited

FOREIGN PATENT DOCUMENTS

| | | |
|---|---|---|
| AU | 2018232195 | 10/2019 |
| AU | 2019202512 | 10/2019 |
| AU | 2018366469 | 5/2020 |
| AU | 2017101887 | 10/2020 |
| AU | 2019291452 | 1/2021 |
| AU | 2020212092 | 7/2021 |
| AU | 2020365568 | 4/2022 |
| AU | 2021239071 | 7/2022 |
| AU | 2022228161 | 9/2022 |
| AU | 2021237758 | 10/2022 |
| AU | 2021238656 | 10/2022 |
| AU | 2021238665 | 10/2022 |
| AU | 2021269719 | 10/2022 |
| AU | 2021272270 | 10/2022 |
| AU | 2021272652 | 10/2022 |
| AU | 2022202525 | 11/2022 |
| AU | 2023202002 | 5/2023 |
| CA | 2500515 | 9/2005 |
| CA | 2500516 | 9/2005 |
| CA | 2500519 | 9/2005 |
| CA | 2500790 | 9/2005 |
| CA | 2518348 | 3/2006 |
| CA | 2587994 | 12/2007 |
| CA | 2611822 | 5/2008 |
| CA | 2686403 | 5/2010 |
| CA | 2906348 | 9/2014 |
| CA | 2954152 | 1/2016 |
| CA | 160490 S | 3/2016 |
| CA | 166803 S | 3/2016 |
| CA | 166804 S | 3/2016 |
| CA | 165232 S | 5/2016 |
| CA | 165233 S | 5/2016 |
| CA | 167431 S | 2/2017 |
| CA | 172872 S | 2/2017 |
| CA | 172873 S | 2/2017 |
| CA | 172874 S | 2/2017 |
| CA | 3019194 | 10/2017 |
| CA | 174116 S | 2/2018 |
| CA | 179097 S | 2/2018 |
| CA | 2981668 A1 | 4/2018 |
| CA | 3055636 A1 | 9/2018 |
| CA | 2951956 | 3/2022 |
| CN | 1842684 | 10/2006 |
| CN | 102725155 | 10/2012 |
| CN | 106470856 | 3/2017 |
| CN | 304097003 | 4/2017 |
| CN | 106976376 | 7/2017 |
| CN | 304288703 S | 9/2017 |
| CN | 304888719 S | 11/2018 |
| CN | 109070688 S | 12/2018 |
| CN | 305029216 S | 2/2019 |
| CN | 305029217 S | 2/2019 |
| CN | 305029218 S | 2/2019 |
| CN | 305105066 S | 4/2019 |
| CN | 110385958 A | 10/2019 |
| CN | 305397384 S | 10/2019 |
| CN | 110520314 A | 11/2019 |
| CN | 209888586 | 1/2020 |
| CN | 210082872 | 2/2020 |
| CN | 210118942 | 2/2020 |
| CN | 111271997 | 6/2020 |
| CN | 111344168 | 6/2020 |
| CN | 111442670 | 7/2020 |
| CN | 306092208 | 10/2020 |
| CN | 112203881 | 1/2021 |
| CN | 112384387 | 2/2021 |
| CN | 213237518 | 5/2021 |
| CN | 213237945 | 5/2021 |
| CN | 306672354 S | 7/2021 |
| CN | 306681352 S | 7/2021 |
| CN | 306901266 S | 10/2021 |
| CN | 215244234 | 12/2021 |
| CN | 114585528 | 6/2022 |
| CN | 307425658 S | 6/2022 |
| CN | 307425659 S | 6/2022 |
| CN | 217022121 | 7/2022 |
| CN | 307449465 S | 7/2022 |
| CN | 115214301 | 10/2022 |
| CN | 115280069 | 11/2022 |
| CN | 115280070 | 11/2022 |
| CN | 115298480 | 11/2022 |
| CN | 115515807 | 12/2022 |
| CN | 115551727 A | 12/2022 |
| CN | 115605361 | 1/2023 |
| CN | 115703320 | 2/2023 |
| DE | 2217596 | 10/1972 |
| DE | 19730136 | 1/1999 |
| DE | 10336767 | 12/2004 |
| DE | 59812376 | 1/2005 |
| DE | 60018543 T2 | 7/2005 |
| DE | 102004032920 A1 | 3/2006 |
| DE | 202004017266 | 4/2006 |
| DE | 202005000560 | 6/2006 |
| DE | 602004004480 | 3/2007 |
| DE | 202006009803 | 12/2007 |
| DE | 602005008048 | 8/2008 |
| DE | 102007038716 | 2/2009 |
| DE | 602005012194 | 2/2009 |
| DE | 102008028066 | 12/2009 |
| DE | 102011102343 A1 | 11/2012 |
| DE | 102016220768 | 4/2018 |
| DE | 102016223050 | 5/2018 |
| DE | 112017000915 | 10/2018 |
| DE | 102017214941 | 2/2019 |
| DE | 102017207797 | 8/2019 |
| DE | 102018206490 | 10/2019 |
| DE | 102019205194 | 10/2019 |
| DE | 102018206854 | 11/2019 |
| DE | 112018003284 | 3/2020 |
| DE | 202015009786 | 3/2020 |
| DE | 212018000248 | 3/2020 |
| DE | 212018000249 | 3/2020 |
| DE | 112018003288 | 4/2020 |
| DE | 102018222877 | 6/2020 |
| DE | 112018005883 | 7/2020 |
| DE | 102019205908 | 10/2020 |
| DE | 112019002266 | 1/2021 |
| DE | 102020209854 | 2/2021 |
| DE | 102019212946 | 3/2021 |
| DE | 102019212947 | 3/2021 |
| DE | 102019212949 | 3/2021 |
| DE | 102020203424 | 7/2021 |
| DE | 102020203422 | 9/2021 |
| DE | 102020203423 | 9/2021 |
| DE | 112020000265 | 9/2021 |
| DE | 102020206181 | 11/2021 |
| DE | 102020206182 | 11/2021 |
| DE | 102020206183 | 11/2021 |
| DE | 112020001585 | 12/2021 |
| DE | 102020208653 | 1/2022 |
| DE | 112020004382 | 6/2022 |
| DE | 102021200499 | 7/2022 |
| DE | 102022203759 | 10/2022 |
| DE | 112021000525 | 12/2022 |
| DE | 102021208289 | 2/2023 |
| DE | 102023200320 | 7/2023 |
| DK | 700801 | 2/1999 |
| DK | 200600972 | 2/2007 |
| DK | 1538009 | 4/2007 |
| DK | 1634740 | 4/2009 |
| DK | 1870270 | 3/2012 |
| EP | 700801 | 7/1998 |
| EP | 869018 | 1/1999 |
| EP | 892225 | 12/2004 |
| EP | 1506886 | 11/2006 |
| EP | 1721765 | 11/2006 |
| EP | 1538009 | 1/2007 |
| EP | 1925889 | 5/2008 |
| EP | 1752717 | 7/2008 |
| EP | 1634740 | 1/2009 |
| EP | 2189312 | 5/2010 |
| EP | 1870270 | 11/2011 |
| EP | 2433658 | 10/2015 |
| EP | 2178710 | 11/2015 |

(56) References Cited

FOREIGN PATENT DOCUMENTS

| | | |
|---|---|---|
| EP | 2192040 | 11/2015 |
| EP | 2196390 | 11/2015 |
| EP | 1955946 | 3/2017 |
| EP | 3113965 | 10/2017 |
| EP | 3303965 | 4/2018 |
| EP | 3401619 | 11/2018 |
| EP | 3564564 | 11/2019 |
| EP | 3241695 | 6/2020 |
| EP | 3411250 | 10/2020 |
| EP | 3797042 | 3/2021 |
| EP | 3436752 | 6/2021 |
| EP | 3592585 | 7/2021 |
| EP | 3910261 | 11/2021 |
| EP | 4121692 | 1/2023 |
| EP | 4121693 | 1/2023 |
| EP | 4121694 | 1/2023 |
| ES | 2119272 | 10/1998 |
| ES | 2557428 | 1/2016 |
| FI | 7327 | 12/2006 |
| IT | 201700090904 | 2/2019 |
| IT | 201700090907 | 2/2019 |
| IT | 201900014247 | 2/2021 |
| IT | 201900019193 | 4/2021 |
| MX | 343494 | 11/2016 |
| MX | 354798 | 3/2018 |
| PL | 382714 | 12/2007 |
| PL | 2504183 | 4/2018 |
| RU | 2753994 | 8/2021 |
| SE | 601741 | 2/2007 |
| SI | 22290 | 12/2007 |
| WO | WO2006021226 | 3/2006 |
| WO | WO2009021994 | 2/2009 |
| WO | WO2011063961 | 6/2011 |
| WO | WO2014143181 | 9/2014 |
| WO | WO2016011073 | 1/2016 |
| WO | WO2016189520 | 12/2016 |
| WO | WO2017143393 | 8/2017 |
| WO | WO2017143394 | 8/2017 |
| WO | WO2017149442 | 9/2017 |
| WO | WO2018096127 | 5/2018 |
| WO | WO2019025633 | 2/2019 |
| WO | WO2019025634 | 2/2019 |
| WO | WO2019025635 | 2/2019 |
| WO | WO2019025636 | 2/2019 |
| WO | WO2019038023 | 2/2019 |
| WO | WO2019097448 | 5/2019 |
| WO | WO2019229706 | 12/2019 |
| WO | WO2019244011 | 12/2019 |
| WO | WO2020114443 | 6/2020 |
| WO | WO2020151541 | 7/2020 |
| WO | WO2020188485 | 9/2020 |
| WO | WO2020192746 | 10/2020 |
| WO | WO2021074841 | 4/2021 |
| WO | WO2021185903 | 9/2021 |
| WO | WO2021185906 | 9/2021 |
| WO | WO2021185918 | 9/2021 |
| WO | WO2021186414 | 9/2021 |
| WO | WO2021228601 | 11/2021 |
| WO | WO2021228605 | 11/2021 |
| WO | WO2021228620 | 11/2021 |
| WO | WO2022162534 | 8/2022 |
| WO | WO2023006307 | 2/2023 |
| WO | WO2023011534 | 2/2023 |
| WO | WO2023017422 | 2/2023 |

OTHER PUBLICATIONS

10-Minute Tech, Trailer Life, Jul. 1996, pp. 69-70 dated Jul. 1, 1996.
American RV Company, Dometic 459530 Duo Therm 13,500 BTU Brisk Air Conditioner High Efficiency Upper Unit Trailer Camper RV, Mar. 23, 2014, https://web.archive.org/web/20140323013456/http://www.americanrvcompany.com/Dometic-459530-Duo-Therm-13500-BTU-Brisk-Air-Conditioner-High-Efficiency-Upper-Unit-Trailer-Camper-RV Mar. 23, 2014.
American RV Company, Dometic 541815 High Performance 13,500 BTU Air Conditioner Upper Unit CCC2 Required Electronics Pre-Installed Camper Trailer RV, https://web.archive.org/web/20140323014940/http://www.americanrvcompany.com/Dometic-541815-High-Performance-13500-BTU-Air-Conditioner-Upper-Unit-CCC2-Required-Electronics-Pre-Installed-Camper-Trailer-RV Mar. 23, 2014.
American RV Company, Dometic 541916 High Performance 15,000 BTU Air Conditioner Upper Unit Single Zone LCD Thermostat Required Electronics Pre-Installed Camper Trailer RV, https://web.archive.org/web/20140323014952/http://www.americanrvcompany.com/Dometic-541916-High-Performance-15000-BTU-Air-Conditioner-Upper-Unit-Single-Zone-LCD-Thermostat-Required-Electronics-Pre-Installed-Camper-Trailer-RV Mar. 23, 2014.
American RV Company, Dometic 551816 High Performance 15,000 BTU Heat Pump for Comfort Control Center II Camper Trailer RV, http://www.americanrvcompany.com/Dometic-551816-High-Performance-15000-BTU-Heat-Pump-for-Comfort-Control-Center-II-Camper-Trailer-RV Apr. 15, 2012.
American RV Company, Dometic 541816 High Performance 15,000 BTU Air Conditioner Upper Unit CCC2 Required Electronics Pre-Installed Camper Trailer RV, http://www.americanrvcompany.com/Dometic-541816-High-Performance-15000-BTU-Air-Conditioner-Upper-Unit-CCC2-Required-Electronics-Pre-Installed-Camper-Trailer-RV Mar. 23, 2014.
Dirna Bergstrom: Slim Cool; http://www.dirna.com/files/dirna-manuals/220RE00183.pdf May 21, 2014.
Dometic Corporation, Dometic High Performance Air Conditioners, 2 pages, Jan. 1, 2011.
Dometic Duo-Therm, p. 140, Feb. 23, 2013.
Dometic Group: "Climate Control", http://www.dometic.com/enus/Americas/USA/RV-Products/climate, 2 pages.
Dometic Waeco Coolair RT 880; http://vwww.dometic.co.uk/product/waeco-coolair-rt-880-2/ May 14, 2015.
Eberspacher Cooltronic Parking Coolers with High Efficiency with the Engine OFF; http://www.eberspacher.com/products/air-conditioning/cooltronic-truck-parking-coolers.html Jun. 23, 2015.
Indelb; WO Oblo; Sleeping Well Oblo; http://www.indelb.com/products/parking_air_cooler/sleeping_well/sw_oblo Apr. 1, 2016.
Webasto: Rooftop air conditioning systems: Rooftop 3.5—9.9 kw; https://web.archive.org/web/20161201014045/https://www.webasto.com/au/markets-products/off-highway/air-conditioning/rooftop-air-conditioning/rooftop-ac-35-99-kw/.
Webasto; Truck parking cooler: Cool Top Vario 10 E; http://www.webasto.com/GB/marketsproducts/truck/air-conditioning/products/cool-top-vario/ Apr. 25, 2016.
Youtube; Viesa Kompressor; https://www.youtube.com/watch?v=SPK17XEvVLO May 22, 2012 (https://www.google.com/?gws_rd=ssl#q=https://www.youtube.com/watch?v%3DSPK17XEvVL0&spf=1495819902591).
Dirna Bergstrom: Parking Coolers—No-Idle Electrical A/C—MiniCool Compact 1.4; http://www.dirna.com/parking-coolers-no-idle-electrical-ac-compact/ Mar. 17, 2015.
Dometic Catalog—Climate Control Products—2015.
Dometic Catalog—Climate Control Products—2016.
U.S. Appl. No. 18/449,354, filed Aug. 14, 2023 titled Air Distribution Apparatus.
Design U.S. Appl. No. 29/915,483, filed Oct. 31, 2023 titled Air Distribution Box.
U.S. Appl. No. 18/262,883, filed Jul. 25, 2023 titled Air Conditioning System for a Vehicle.
Design U.S. Appl. No. 29/915,796, filed Nov. 3, 2023 titled Housing Edge For Air Conditioning Apparatus.
Design U.S. Appl. No. 29/915,798, filed Nov. 3, 2023 titled Housing Portion For Air Conditioning Apparatus.
Design U.S. Appl. No. 29/915,799, filed Nov. 3, 2023 titled Housing For Air Conditioning Apparatus.
Office Action issued in DE Application No. 1020232003201 mailed on Aug. 22, 2023.
DE Patent Application No. 1020232003201 titled "Roof-Mounted Unit for Air Conditioner of Vehicle, and Air Conditioner Comprising Same" filed on Jan. 17, 2023.

(56) References Cited

OTHER PUBLICATIONS

CN Application No. 202220152747.9 titled "A Roof Top Unit of an Air Conditioner for a Vehicle and an Air Conditioner Comprising the Same" filed on Jan. 20, 2022.
Notice to Grant issued in CN Application No. 202220152747.9 mailed on Apr. 24, 2022.
Patent Certificate issued in CN Application No. 202220152747.9 mailed on Jul. 22, 2022.

* cited by examiner

ROOF-MOUNTED UNIT FOR AIR CONDITIONER OF VEHICLE, AND AIR CONDITIONER COMPRISING SAME

CLAIM TO PRIORITY

This U.S. non-provisional patent application claims priority to and benefit of, under 35 U.S.C. § 119 (a), Chinese Patent Application No. 202220152747.9, filed Jan. 20, 2022, all of which is incorporated by reference herein.

TECHNICAL FIELD

The present embodiments relate to the technical field of air conditioners, in particular to the field of vehicle air conditioners, and more specifically, but without limitation, to a roof-mounted unit for a roof-mounted air conditioner.

BACKGROUND ART

For a vehicle such as a recreational travel vehicle in the form of a van, a motorhome or a trailer, an air conditioner is usually mounted at the roof of the vehicle to provide heated or cooled regulated air inside the vehicle, in order to make the environment more comfortable for occupants.

This roof-mounted air conditioner includes an integrated air conditioner, that is, an air conditioner having components such as an evaporator, a compressor and a condenser, accommodated in a roof-mounted unit therefor.

For this integrated vehicle air conditioner, the roof-mounted unit usually comprises a top cover and a chassis jointed to the top cover, the top cover and the chassis providing a space for accommodating the components such as the evaporator, the compressor and the condenser. In the prior art, as shown in FIG. 3, the top cover, at a joint part thereof, is usually sequentially provided with, from an outer side to an inner side, a recess and a projection; and the chassis, at a joint part thereof, is usually sequentially provided with, from an outer side to an inner side, a recess and a projection matching those of the top cover, thereby achieving a sealing joint between the top cover and the chassis.

However, when in use, vibrations from the components such as the compressor inside the roof-mounted unit often cause the top cover and the chassis to move out of their original positions, creating an opening between the top cover and the chassis, thus possible external water flows into the interior of the roof-mounted unit along the opening, and then flows into the interior of the vehicle along an indoor return air outlet of the air conditioner.

Attempts have been made to strengthen a joint between the top cover and the chassis by preparing the top cover and the chassis with an elastic material to provide a horizontal lateral pressure in their joint part or by employing an additional reinforcing fastener to provide a fastening force in a vertical direction, in order to provide a better sealing waterproof effect.

However, the improved sealing waterproof effect is not obvious, but increases the complexity of product manufacturing, and generates an additional manufacturing cost.

SUMMARY

The technical problem to be solved by the present example is to provide a roof-mounted unit having an improved waterproof function in view of the above-mentioned defect in the prior art.

One concept of the present embodiments for solving the technical problem thereof is to use a roof-mounted unit with a U-shaped clamping structure to achieve an improved waterproof function.

In the present embodiments, the roof-mounted unit provides a U-shaped clamping structure at a joint part of a top cover and a chassis, and even if a sealing joint of the top cover and the chassis may have an opening due to vibration, water entering the opening will also tend to flow in through the opening instead of entering the interior of the roof-mounted unit, thereby achieving an improved waterproof function.

Specifically, the present embodiments provide a roof-mounted unit for an air conditioner of a vehicle, the roof-mounted unit being mounted at the top of a vehicle and comprising a top cover and a chassis jointed to the top cover in a sealed manner, in which the top cover comprises an upper housing and an upper foam shell attached to an inner side of the upper housing, and the chassis comprises a base and a lower foam shell attached to an inner side of the base, wherein the upper foam shell, at a joint part thereof, sequentially comprises, from an outer side to an inner side, a first upper projection, a first upper recess and a second upper projection; the lower foam shell, at a joint part thereof, sequentially comprises, from an outer side to an inner side, a first lower recess and a first lower projection; and when the top cover is jointed to the chassis in a sealed manner, the first upper projection is jointed to the first lower recess in a matching manner, the first upper recess is jointed to the first lower projection in a matching manner, and the second upper projection is attached to an inner side of the first lower projection, thereby achieving a sealing joint between the upper foam shell and the lower foam shell.

In the roof-mounted unit for an air conditioner of a vehicle according to an aspect of the present embodiments, the top cover is circumferentially jointed to the chassis on a side face of the roof-mounted unit in a sealed manner.

In the roof-mounted unit for an air conditioner of a vehicle according to an aspect of the present embodiments, the longitudinal sections of the first upper projection, the first upper recess and the second upper projection of the upper foam shell and the longitudinal sections of the first lower recess and the first lower projection of the lower foam shell are rectangular.

The roof-mounted unit further involves a self-locking structure. With the self-locking structure, the top cover and the chassis of the roof-mounted unit can be more tightly locked together, which greatly reduces the possibility of dislocation or opening caused by vibrations of the top cover and the chassis, further improves the joint fastness and tightness of the joint part, and increases a waterproof effect of the roof-mounted unit.

Specifically, in the roof-mounted unit for an air conditioner of a vehicle according to an aspect, the first upper projection comprises a first protrusion on an inner side face thereof, and the first lower projection comprises a first depression matching the first protrusion on an outer side face thereof.

In the roof-mounted unit for an air conditioner of a vehicle according to an aspect of the present examples, the second upper projection comprises a second protrusion on an outer side face thereof, and the first lower projection comprises a second depression matching the second protrusion on an inner side face thereof.

In the roof-mounted unit for an air conditioner of a vehicle according to an aspect of the present examples, the first upper projection comprises a first protrusion on an inner side face thereof, and the first lower projection comprises a first depression matching the first protrusion on an outer side face thereof; and the second upper projection comprises a second protrusion on an outer side face thereof, and the first lower projection comprises a second depression matching the second protrusion on an inner side face thereof.

In the roof-mounted unit for an air conditioner of a vehicle according to an aspect of the present examples, a joint face between the upper housing and the base is below a joint face between the first upper projection of the upper foam shell and the first lower recess of the lower foam shell. Based on the setting of this position relationship, it is more difficult for water entering from the joint face between the upper housing and the base to reach a possible opening between the upper foam shell and the lower foam shell, so that the waterproof function of the roof-mounted unit of the present examples is further improved.

In the roof-mounted unit for an air conditioner of a vehicle according to an aspect of the present examples, the upper foam shell is an EPP upper foam shell, and the lower foam shell is an EPP lower foam shell.

According to another aspect of the present examples, the air conditioner for a vehicle, the air conditioner comprises a roof-mounted unit as mentioned above.

BRIEF DESCRIPTION OF THE DRAWINGS

The present utility embodiments will be further described below in conjunction with the accompanying drawings and the embodiments. In the accompanying drawings.

DETAILED DESCRIPTION OF EMBODIMENTS

Figure 1:
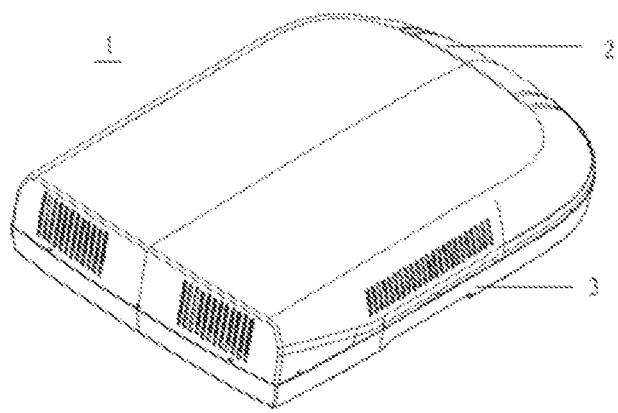
FIG. 1 is an overall schematic diagram of a roof-mounted unit for a roof-mounted air conditioner.

The embodiments will be described in detail below, and the embodiments are shown in the accompanying drawings, in which the same or similar reference numerals refer to the same or similar elements or the elements having the same or similar functions. The embodiments described below with reference to the accompanying drawings are exemplary and are intended to be illustrative, but should not be construed as limiting.

Figure 2:
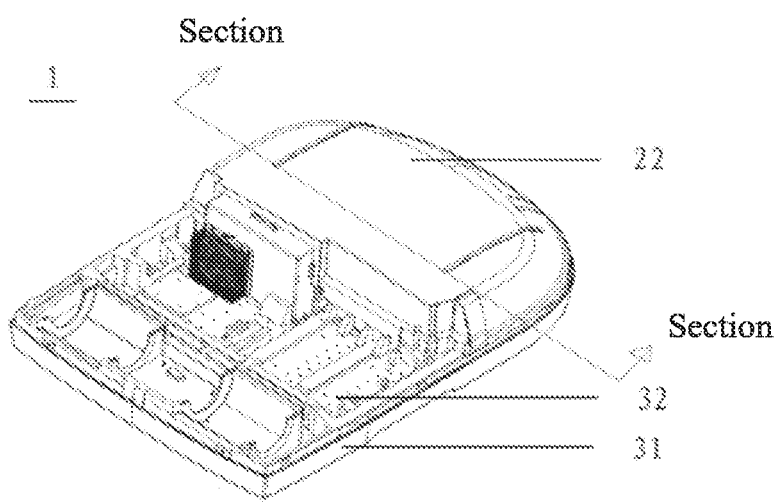
FIG. 2 is a partial sectional view of the roof-mounted unit shown in FIG. 1.
Figure 3:
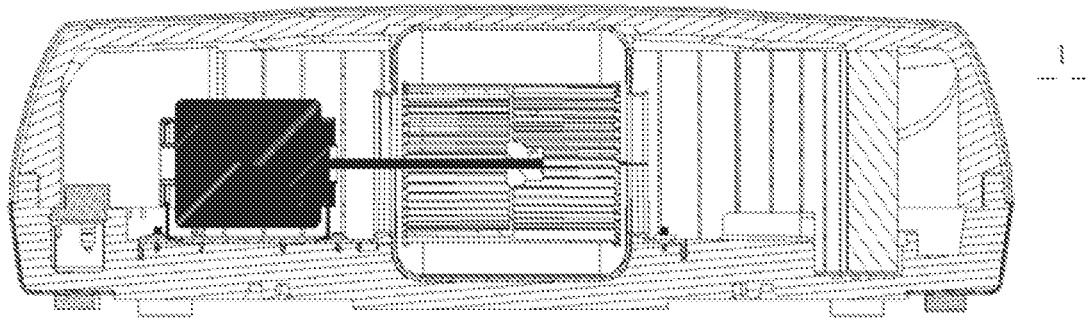
FIG. 3 is a longitudinal sectional view of a roof-mounted unit in the prior art.

First referring to FIG. 1 and FIG. 2, provided is a roof-mounted unit 1 for an air conditioner mounted at a roof of a vehicle (such as a recreational travel vehicle). The air conditioner is a type of an integrated vehicle air conditioner, that is, components such as an evaporator, a compressor and a condenser, are accommodated in the roof-mounted unit 1 comprising a top cover 2 and a chassis 3. When in use, the top cover 2 is jointed to the chassis 3 to form an accommodating space for accommodating the components such as the evaporator, the compressor and the condenser, and form a sealing joint in a joint part.

Figure 4:
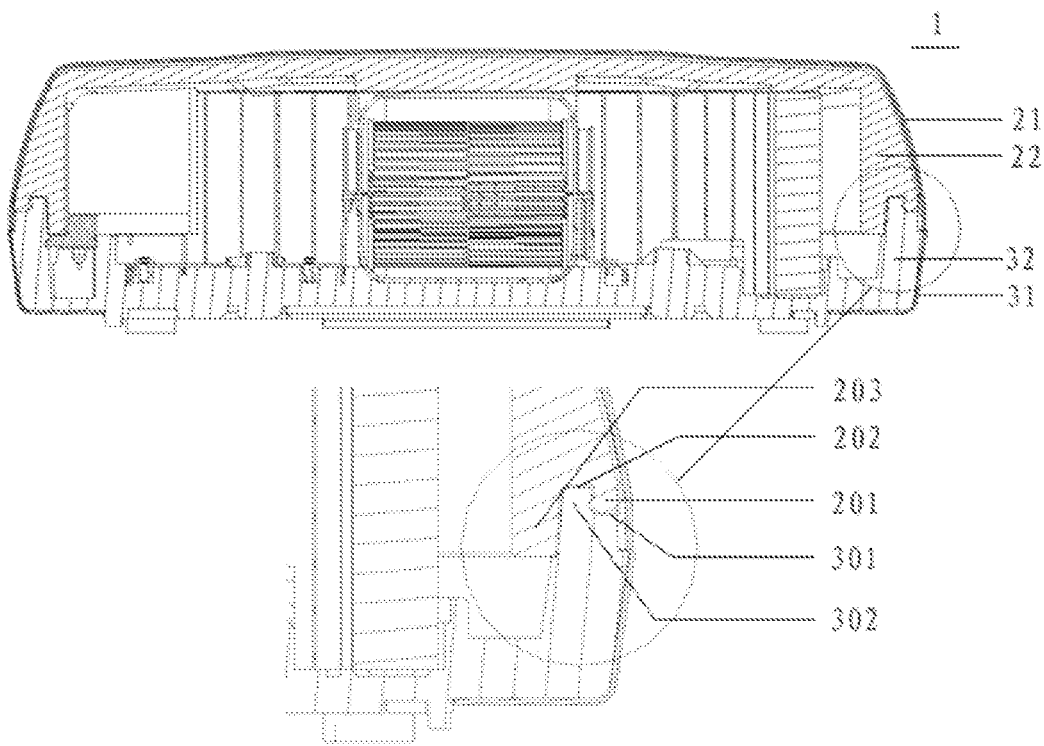
FIG. 4 is a longitudinal sectional view and a partial enlarged view of a roof-mounted unit according to one embodiment.
Figure 5:
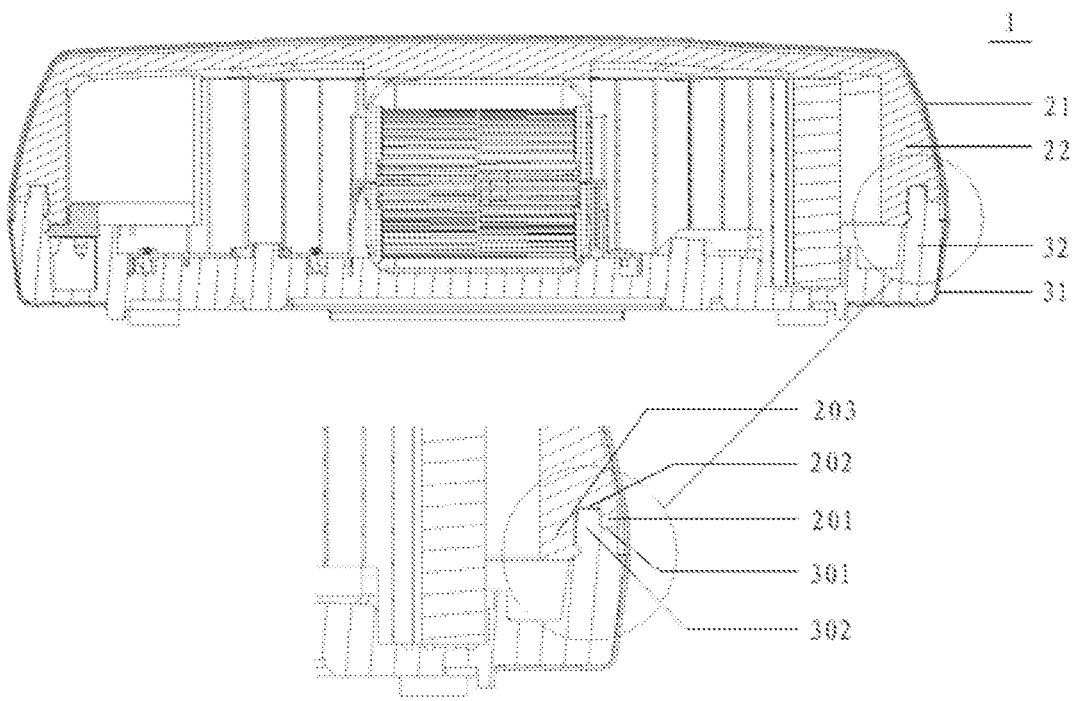
FIG. 5 is a longitudinal sectional view and a partial enlarged view of a roof-mounted unit according to one other embodiment.
Figure 6:
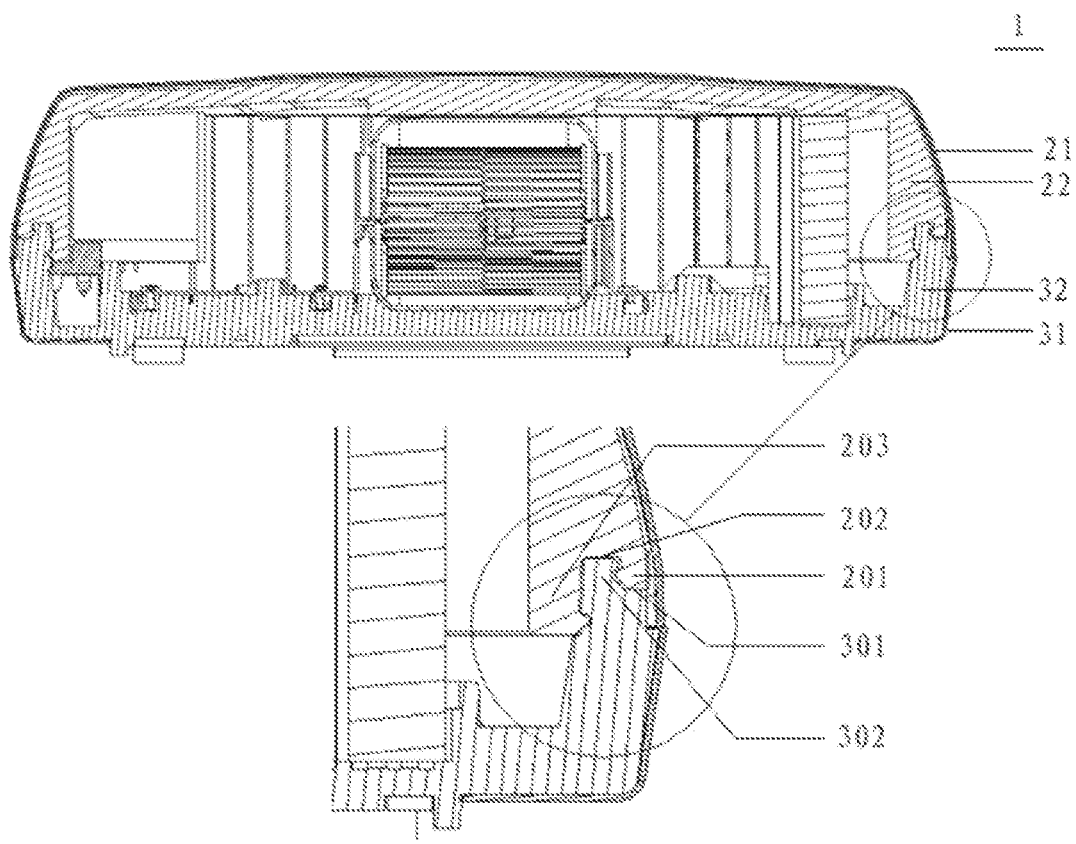
FIG. 6 is a longitudinal sectional view and a partial enlarged view of a roof-mounted unit according to one other embodiment.

As shown in FIGS. 4-6 and also referring to FIGS. 1-2, in the roof-mounted unit 1 according to the present embodiments, the top cover 2 comprises an upper housing 21 and an upper foam shell 22 attached to an inner side of the upper housing, and the chassis 3 comprises a base 31 and a lower foam shell 32 attached to an inner side of the base, wherein the upper foam shell 22, at a joint part thereof, sequentially comprises, from an outer side to an inner side, a first upper projection 201, a first upper recess 202 and a second upper projection 203; the lower foam shell 32, at a joint part thereof, sequentially comprises, from an outer side to an inner side, a first lower recess 301 and a first lower projection 302; and when the top cover 2 is jointed to the chassis 3 in a sealed manner, the first upper projection 201 is jointed to the first lower recess 301 in a matching manner, the first upper recess 202 is jointed to the first lower projection 302 in a matching manner, and the second upper projection 203 is attached to an inner side of the first lower projection 302, thereby achieving a sealing joint between the upper foam shell 22 and the lower foam shell 32.

According to some embodiments, the top cover 2 is circumferentially jointed to the chassis 3 on a side face of the roof-mounted unit 1 in a sealed manner.

According to some embodiments, the longitudinal sections of the first upper projection 201, the first upper recess 202 and the second upper projection 203 of the upper foam shell 22 and the longitudinal sections of the first lower recess 301 and the first lower projection 302 of the lower foam shell 32 are rectangular.

According to a further embodiment, as shown in FIG. 4, the first upper projection 201 comprises a first protrusion on an inner side face thereof, and the first lower projection 302 comprises a first depression matching the first protrusion on an outer side face thereof, achieving "an overbite outside self-locking seal".

According to a further embodiment, as shown in FIG. 5, the second upper projection 203 comprises a second protrusion on an outer side face thereof, and the first lower projection 302 comprises a second depression matching the second protrusion on an inner side face thereof, achieving "an overbite inside self-locking seal".

According to a further embodiment, as shown in FIG. 6, the first upper projection 201 comprises a first protrusion on an inner side face thereof, and the first lower projection 302 comprises a first depression matching the first protrusion on an outer side face thereof; and the second upper projection 203 comprises a second protrusion on an outer side face thereof, and the first lower projection 302 comprises a second depression matching the second protrusion on an inner side face thereof, achieving "an overbite double self-locking seal".

With the self-locking structure further provided, the top cover and the chassis of the roof-mounted unit can be more tightly locked together, which greatly reduces the possibility of dislocation or opening caused by vibrations of the top cover and the chassis, also further improves the joint fastness and tightness of the joint part, and increases a waterproof effect of the roof-mounted unit.

According to a further embodiment, as shown in FIGS. 4-6, a joint face between the upper housing 21 and the base 31 is below a joint face between the first upper projection 201 of the upper foam shell 22 and the first lower recess 301 of the lower foam shell 32. Thus, it is more difficult for water entering from the joint face between the upper housing and the base to reach a possible opening between the upper foam shell and the lower foam shell, so that the waterproof function of the roof-mounted unit is further improved.

According to a further embodiment, the upper foam shell is an EPP upper foam shell, and the lower foam shell is an EPP lower foam shell.

In the description of the present embodiments, it should be understood that the orientations, the position relationships or the shapes indicated by the terms such as "upper", "lower", "inner", "outer", "above", "below", "recess" and "projection" are based on the orientations, the position relationships or the shapes shown in the accompanying drawings, which is only for ease of description of the present embodiments and for simplifying the description, rather than indicating or implying that the devices or elements referred to necessarily have a specific orientation structure and operation, and therefore cannot be construed as limiting the present embodiments.

Furthermore, the terms "first" and "second" are used to distinguish one from the other for descriptive purposes only and should not be construed as indicating or implying the relative importance and order.

Although the embodiments have been shown and described above, it should be understood that the above embodiments are exemplary and cannot be understood as limiting, and those of ordinary skill in the art would have made combinations, changes, modifications, replacements and variations to the above embodiments within the scope of the present claims.

The invention claimed is:

1. A roof-mounted unit for an air conditioner of a vehicle comprising, the roof-mounted unit being mounted on the top of said vehicle and comprising a top cover and a chassis jointed to the top cover in a sealed manner, in which the top cover comprises an upper housing and an upper foam shell attached to an inner side of the upper housing, and the chassis comprises a base and a lower foam shell attached to an inner side of the base;

the upper foam shell, at a joint part thereof, sequentially comprises, from an outer side to an inner side, a first upper projection, a first upper recess and a second upper projection; the lower foam shell, at a joint part thereof, sequentially comprises, from an outer side to an inner side, a first lower recess and a first lower projection; and when the top cover is jointed to the chassis in the sealed manner, the first upper projection is jointed to the first lower recess in a matching manner, the first upper recess is jointed to the first lower projection in a matching manner, and the second upper projection is attached to an inner side of the first lower projection, thereby achieving a sealing joint between the upper foam shell and the lower foam shell.

2. The roof-mounted unit for an air conditioner of a vehicle according to claim 1, wherein the top cover is circumferentially jointed to the chassis on a side face of the roof-mounted unit in the sealed manner.

3. The roof-mounted unit for an air conditioner of a vehicle according to claim 2, wherein longitudinal sections of the first upper projection, the first upper recess and the second upper projection of the upper foam shell and the longitudinal sections of the first lower recess and the first lower projection of the lower foam shell are rectangular.

4. The roof-mounted unit for an air conditioner of a vehicle according to claim 2, wherein the first upper projection comprises a first protrusion on an inner side face thereof, and the first lower projection comprises a first depression matching the first protrusion on an outer side face thereof.

5. The roof-mounted unit for an air conditioner of a vehicle according to claim 2, wherein the second upper projection comprises a second protrusion on an outer side face thereof, and the first lower projection comprises a second depression matching the second protrusion on an inner side face thereof.

6. The roof-mounted unit for an air conditioner of a vehicle according to claim 2, wherein the first upper projection comprises a first protrusion on an inner side face thereof, and the first lower projection comprises a first depression matching the first protrusion on an outer side face thereof, and the second upper projection comprises a second protrusion on an outer side face thereof, and the first lower projection comprises a second depression matching the second protrusion on an inner side face thereof.

7. The roof-mounted unit for an air conditioner of a vehicle according to claim 2, wherein a joint face between the upper housing and the base is below a joint face between the first upper projection of the upper foam shell and the first lower recess of the lower foam shell.

8. The roof-mounted unit for an air conditioner of a vehicle according to claim 2, wherein the upper foam shell is an EPP upper foam shell, and the lower foam shell is an EPP lower foam shell.

* * * * *